July 11, 1933.  O. B. GOLDKAMP  1,917,643
CLEANER FOR FLUIDS
Filed Oct. 20, 1930
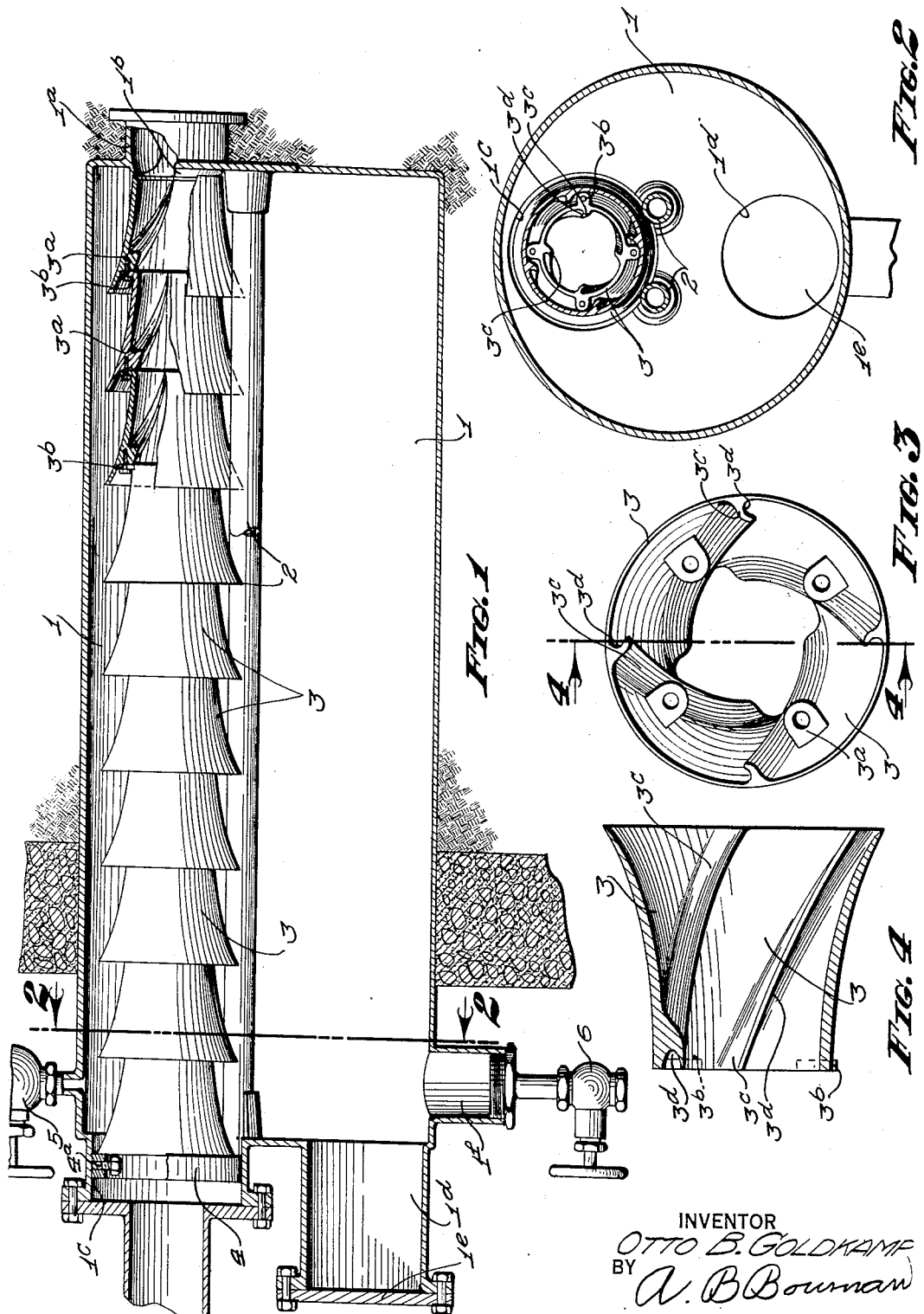
INVENTOR
OTTO B. GOLDKAMP
BY A. B. Bouman
ATTORNEY Patented July 11, 1933

1,917,643

UNITED STATES PATENT OFFICE

OTTO B. GOLDKAMP, OF SAN DIEGO, CALIFORNIA, ASSIGNOR OF ONE-HALF TO SAN DIEGO CONSOLIDATED GAS AND ELECTRIC COMPANY, OF SAN DIEGO, CALIFORNIA, A CORPORATION OF CALIFORNIA

CLEANER FOR FLUIDS

Application filed October 20, 1930. Serial No. 489,752.

My invention relates to cleaners for fluids and the objects of my invention are:

First, to provide a cleaner of this class which is particularly adapted to separate deleterious matter from gases;

Second, to provide a cleaner of this class which cannot clog up even though it has removed deleterious matter up to its capacity, thus enabling its use in connection with a gas main where clogging is particularly expensive and dangerous;

Third, to provide a cleaner of this class which takes advantage of the fact that gases or liquids flowing in a pipe have their greater rate of flow at their center and a less rate of flow adjacent the walls of the pipe;

Fourth, to provide a cleaner of this class which not only removes solid particles from the fuel gas such as grit, but also removes liquid particles such as water and certain liquids given off as a by-product in the production of fuel gas;

Fifth, to provide a cleaner of this class in which the movement of the gases therethrough causes it to rotate and throw off the heavier particles;

Sixth, to provide a cleaner of this class which though primarily adapted for separating liquid and solid particles from gas, is also adapted to separate heavier liquids or solid particles from lighter liquids such as water or the like, and grit from gasoline;

Seventh, to provide a cleaner of this class in which the drop in the pressure of fluids passing therethrough is particularly low, in fact, comparable with the slight drop in pressure of a section of plain pipe equal in length to the cleaner, thus providing a cleaner for fluids which, when attached in the line, does not appreciably affect the pressure therein;

Eighth, to provide a cleaner of this class which may be cleaned and repaired entirely from one end thereof, so that the major portion of the cleaner may be imbedded in the walls of a work pit intersected by the gas line; and Ninth, to provide on a whole a novelly constructed cleaner for fluids which is simple of construction proportional to its function, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a longitudinal sectional view of my cleaner for fluids with parts and portions shown in section and the deflecting portions of the separator units omitted to facilitate the illustration; Fig. 2 is a transverse sectional view thereof taken through 2—2 of Fig. 1; Fig. 3 is an enlarged elevational view of one of the separator units; and Fig. 4 is a longitudinal sectional view thereof.

Similar characters of reference refer to similar parts and portions throughout the several views of the drawing.

The cleaner is mounted within a cylindrical casing 1. This casing is closed at one end except for an inlet 1a arranged above the axis of the casing near its upper side. The inlet 1a is in the form of a short tubing extending from the casing and provided with means for attaching it to a gas line. The inlet tubing 1a extends a short distance into the casing 1 and is slightly constricted, as indicated by 1b.

The opposite or forward end of the casing 1 is provided with an outlet 1c, co-axially disposed relative to the inlet 1a, also in the form of a short tubing but of larger diameter than said inlet 1a. The outlet 1c is provided with means for attaching it to the pipe line shown fragmentarily.

Below the outlet 1c, the casing 1 is intersected by a clean-out tube 1d, the extended end of which is provided with a cover 1e. The tube 1d forms an access to the lower portion of the casing below the openings 1a and 1c.

Supported within the casing just below the common axis of the inlet 1a and outlet 1c, is a pair of separator carrier rods 2. Supported by the rods and adapted to slide thereon are a plurality of separator units 3.

Each separator unit is circular in cross section and smaller at its receiving end than at its discharge end, the walls thereof curving radially outwardly or diverging from the receiving or inlet end. Each separator unit thus has approximately the shape of a Venturi tube.

Arranged within and a short distance from the discharge or larger end of each separator unit are several bosses 3a. Extending radially outwardly from the inlet or smaller end of each separator unit, except the innermost unit, are several lugs 3b. The lugs 3b are adapted to fit on the ends of the bosses 3a and be secured thereto by means of bolts or screws, thus the receiving or smaller end of each separator unit telescopes slightly into the discharge or larger end of the adjacent unit, as shown in Fig. 1, forming annular openings broken by the lugs and bosses 3b and 3a. These openings discharge into the casing 1.

The innermost unit adjacent the inlet 1a is without the lugs 3a but the margin of the opening at its receiving or smaller end is beveled slightly so as to fit over the slight construction 1b, as shown in Fig. 1.

Each separator unit 3 is provided with a plurality of internal helical ridges 3c on its inner side. Formed along the side of each ridge against which the gases strike when passing through the separator is a groove or channel 3d, extending longitudinally with the ridge, its one margin merging into the inner surface of the separator.

The outermost separator unit 3 fits slightly within the outlet opening 1c. The train of separator units are held in the position with the innermost unit bearing against the constricted portion 1b of the inlet by means of a retainer ring 4, which fits within the inlet opening 1c and is provided with set screws 4a, which engage the inner walls of said outlet opening.

The casing 1 is arranged so that it may be mounted within the walls of a work pit with only its forward end portion protruding as shown in Fig. 1. At this forward or protruding end portion, at the upper side of the casing 1 is provided a blow-off valve 5. A sump 1f is provided in the under side of this exposed or protruding portion of the casing, to which is fitted a drain valve 6.

Operation of my cleaner for fluids is as follows:

It is well known that the velocity of flow of a liquid or gas through a pipe is greater at the center and least adjacent the walls of the pipe. That is the peripheral portions of a column of fluid passing through a pipe move with less velocity than the central portion of said column. It is in the peripheral portions of this column adjacent the walls of the pipe that practically all of the deleterious matter is carried.

When a gas passes through a separator unit, the gas expands with the increasing diameter of the unit, causing the area adjacent the walls of the pipe to follow the diverging walls of the separator unit and pass out the openings between the discharge end of one unit and inlet end of the adjacent unit. This action is repeated as the gas passes through each unit so that by supplying a sufficient number of units, the gas merges practically free of liquid or grit.

The gas carrying the deleterious matter after leaving the train of separators passes into the casing 1 in which the velocity is very low or lacking altogether. This allows the heavier particles, liquid and solid matter to settle to the bottom of the casing and fill the space from where it may be removed through the clean-out opening 1d or the drain valve 6.

The above action takes place even though the internal helical ridges 3c are omitted. However, with these ridges added, the efficiency is increased because the gas flowing through the cleaner, particularly its peripheral portions is given a rotary motion which tends to separate the heavier particles by centrifugal force. Once caught by the channels 3d, the deleterious matter is guided therealong and directed out the annular space between the discharge end of one separator and the receiving end of the adjacent one.

It can be seen that should the space 1g within the casing below the separator be completely filled with deleterious matter, that the cleaner would not become clogged but would continue to pass the gas through, though of course not cleaning it. This is particularly important when the device is installed on mains.

Operation is practically the same when the device is used to clean liquids, such as gasoline from which it is desired to remove water and grit. With liquid, however, the usefulness of the internal ridges 3c is increased, as liquids are practically non-compressible and non-expansible.

It is obvious from the construction as illustrated in the drawing and described in the foregoing specification, that there is provided a cleaner for fluids as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what

I claim as new and desire to secure by Letters Patent is:

1. In a cleaner for fluids, a casing provided with an inlet and an outlet at opposite ends near its upper side, a separator means comprising a plurality of separator units fastened together in a train, said separator insertable through the outlet opening of said casing and fitted against the inlet opening of said casing, each of said separator units being smaller at its inlet end than at its discharge end and having an unobstructed central passage, whereby the inlet end of one separator unit fits in the outer or larger end of the adjacent unit, means for spacing the inlet ends of said separator units from the walls of the adjacent units in which they fit, whereby the central portions of a column of fluid pass directly and consecutively through said separator units, and the peripheral portions of said column of fluid pass between said separator units and into said casing.

2. In a cleaner for fluids, a casing having an inlet and an outlet, and a train of separator units extending between said inlet and said outlet, each of said separator units having a constricted inlet end and an enlarged outlet end, and an unobstructed central passage whereby the peripheral portion of a column of fluid passing through said separator passes out of said train of separator units between the discharge ends of said units and the intake end of adjacent units and into said casing, and whereby the central portion of said column of fluid continues through said train of separator units, and helical fins extending inwardly from the wall of said separator units for facilitating the flow of the peripheral portions of said column of fluid into said casing and leaving a large direct central passage for the direct flow of fluid.

3. In a cleaner for fluids, a casing having an inlet and an outlet, a separator means affording a passage between said inlet and said outlet, and comprising a series of similarly dimensioned sections, the walls of which diverge towards said outlet and having a direct unobstructed central passage, and helical fins arranged in said separator means around said central passage.

4. In a cleaner for fluids, a casing having an inlet and an outlet, a separator means affording a passage between said inlet and said outlet comprising a train of similarly dimensioned open-ended sections, the walls of which diverge towards said outlet, the small ends of said sections partially telescoping into the large ends of adjacent sections, and internal helical fins extending along the inner walls only of said sections and leaving a large central unobstructed opening.

5. In a cleaner for fluids, a casing having an inlet and an outlet, and a train of separator units extending between said inlet and said outlet, each of said separator units having a constricted inlet end and an enlarged outlet end and a direct unobstructed central passage, whereby the peripheral portion of a column of fluid passing through said separator passes out of said train of separator units between the discharge ends of said units and the intake ends of adjacent units and into said casing, and whereby the central portion of said column of fluid continues through said train of separator units, and helical fins arranged within said separator units for facilitating the flow of the peripheral portions of said column of fluid into said casing, said helical fins provided with channels on the sides thereof for receiving the impact of said column of fluid.

6. In a cleaner for fluids, a casing having an inlet and an outlet, a separator means affording a passage between said inlet and said outlet comprising a train of similarly dimensioned open-ended sections, the walls of which diverge towards said outlet, the small ends of said sections partially telescoping into the large ends of adjacent sections, and internal helical fins extending inwardly a short distance only along the inner walls of said sections leaving a large central unobstructed opening, said helical fins being integral with the said sections of said separator means and extending in the direction of flow of said column of fluid.

7. A cleaner for fluids consisting of a casing having an inlet and an outlet and a train of separator units extending between said inlet and said outlet, all of said units communicating with said casing, each of said separator units having a constricted inlet end and an enlarged outlet end and an unobstructed direct central opening whereby the peripheral portion of a column of fluid passing through said separator passes out of said train of separator units between the discharge ends of said units and the intake end of adjacent units and into said casing, and whereby the central portion of said column of fluid moves directly through the central portion of said train of separator units, and helical fins arranged within said separator units for facilitating the flow of the peripheral portion of said column of fluid in said casing, said helical fins provided with channels on the sides thereof for receiving the impact of said column of fluid.

In testimony whereof, I have hereunto set my hand at San Diego, California this 19th day of September, 1930.

OTTO B. GOLDKAMP.